(12) United States Patent
Tang et al.

(10) Patent No.: US 9,350,244 B2
(45) Date of Patent: *May 24, 2016

(54) SWITCHING REGULATOR WITH INCREASED LIGHT LOAD EFFICIENCY IN PULSE FREQUENCY MODULATION MODE

(71) Applicant: Infineon Technologies Austria AG, Villach (AT)

(72) Inventors: Benjamim Tang, Rancho Palos Verdes, CA (US); Amir Babazadeh, Irvine, CA (US); Giuseppe Bernacchia, Redondo Beach, CA (US); Kenneth Ostrom, Palos Verdes Estates, CA (US)

(73) Assignee: Infineon Technologies Austria AG, Villach (AT)

( * ) Notice: Subject to any disclaimer, the term of this patent is extended or adjusted under 35 U.S.C. 154(b) by 0 days.

This patent is subject to a terminal disclaimer.

(21) Appl. No.: 14/514,497

(22) Filed: Oct. 15, 2014

(65) Prior Publication Data

US 2015/0061619 A1 Mar. 5, 2015

Related U.S. Application Data

(63) Continuation of application No. 13/194,314, filed on Jul. 29, 2011, now Pat. No. 8,896,280.

(51) Int. Cl.
*G05F 1/00* (2006.01)
*H02M 3/158* (2006.01)
*H02M 1/00* (2006.01)

(52) U.S. Cl.
CPC ............ *H02M 3/158* (2013.01); *H02M 3/1584* (2013.01); *H02M 2001/0032* (2013.01); *Y02B 70/16* (2013.01)

(58) Field of Classification Search
USPC .......................................... 323/269, 272, 285
See application file for complete search history.

(56) References Cited

U.S. PATENT DOCUMENTS

| 5,583,753 | A | 12/1996 | Takayama |
| 6,703,812 | B1 * | 3/2004 | Lethellier ..................... 323/222 |
| 6,943,535 | B1 * | 9/2005 | Schiff ........................... 323/246 |
| 6,995,548 | B2 | 2/2006 | Walters et al. |
| 7,071,660 | B2 | 7/2006 | Xu et al. |

(Continued)

FOREIGN PATENT DOCUMENTS

DE 10216252 A1 11/2003
DE 202009009853 U1 4/2010

OTHER PUBLICATIONS

Mappus, Steve, "Optimizing MOSFET Gate Drive Voltage", as published in analog Zone.
Meola, Markus, "Digital PFM Controller with Adaptive on Time based on Load Current Estimation", 2008, IEEE, pp. 3695-3700.
Mulligan, Mich, "A Constant-Frequency Method for Improving Light-Load Efficiency in Synchronous Buck Converters", IEEE Power Electronics Letters, 2005.

(Continued)

*Primary Examiner* — Adolf Berhane
*Assistant Examiner* — Gary Nash
(74) *Attorney, Agent, or Firm* — Murphy, Bilak & Homiller, PLLC (57) ABSTRACT

A switching regulator includes a multiphase converter which includes a plurality of main phases configured to covert a power supply voltage to a lower voltage for application to an electronic device at different load conditions. The switching regulator also includes an auxiliary phase configured to operate in a pulse frequency modulation mode during a light load condition so that power is supplied to the electronic device by at least the auxiliary phase during the light load condition.

22 Claims, 5 Drawing Sheets

(56) References Cited

U.S. PATENT DOCUMENTS

| | | |
|---|---|---|
| 7,109,689 B2 | 9/2006 | Schneider |
| 7,259,473 B2 | 8/2007 | Petricek |
| 2002/0180410 A1* | 12/2002 | Brooks ................. 323/282 |
| 2005/0093525 A1* | 5/2005 | Walters et al. ............ 323/272 |
| 2008/0129259 A1* | 6/2008 | Endo et al. ............... 323/271 |
| 2008/0307242 A1 | 12/2008 | Qu |
| 2009/0046487 A1 | 2/2009 | Emira |
| 2009/0230939 A1* | 9/2009 | Nakazawa ............... 323/285 |
| 2010/0141230 A1* | 6/2010 | Lukic et al. ............. 323/283 |
| 2010/0176782 A1* | 7/2010 | Kudo .................... 323/282 |
| 2010/0320983 A1 | 12/2010 | Wu |
| 2011/0018354 A1 | 1/2011 | Liu |

OTHER PUBLICATIONS

Sahu, Biranchinath et al., "An Accurate, Low-Voltage, CMOS Switching Power Supply With Adaptive On-Time Pulse-Frequency Modulation (PFM) Control", IEEE Transactions on Circuit and Systems—I: Regular Papers, vol. 54, No. 2, Feb. 2007, pp. 312-321.

Wei, Jia, "High Frequency High-Efficiency Voltage Regulators for Future Microprocessors", dissertation submitted to the faculty of the Virginia Polytechnic Institute and State University, Sep. 15, 2004, Blacksburg, VA.

Wei, Jia, "Two-Stage Laptop VRs", CPES Proprietary, Sep. 19, 2003, San Jose, CA.

* cited by examiner

SWITCHING REGULATOR WITH INCREASED LIGHT LOAD EFFICIENCY IN PULSE FREQUENCY MODULATION MODE

FIELD OF TECHNOLOGY

The present application relates to switching regulators, in particular switching regulators which are efficient at light load conditions.

BACKGROUND

Processors such as CPUs (central processor units), DSPs (digital signal processors) and microprocessors, and other electronic devices require accurate voltage supplies capable of supplying large amounts of current and maintaining tight voltage regulation when subject to very fast transients. Multiphase, high frequency buck converters are capable of supplying high current, high accuracy power to such electronic devices. Power supply efficiency, i.e. the ratio of output power delivered to the load and input power supplied by the input voltage, is a critical performance parameter for both energy efficiency and thermal management of power supply components. Typically, systems focus on both efficiency at maximum load, and maximum efficiency, which typically occurs at about 20-50% of maximum load.

Under light load conditions, the load enters a low activity state and the current drops to less than about 5% of maximum load. The efficiency under such light loads is significantly below the maximum efficiency and continues to decrease as the load current is further reduced. Efficiency at light load conditions is increasingly becoming a greater concern because conventional systems are not optimized for efficiency at light load conditions and usage models indicate a significant amount of computing resources are idle most of the time. This is problematic for both servers where thermal management of data centers is a key consideration in cost of operation, and for desktop and notebook computers and portable electronic devices where battery life and quiet operation are highly valued.

Conventional controllers for power converters employ control schemes that allow the switching regulator to seamlessly switch from CCM (continuous current mode) to DCM/PFM (discontinuous current mode/pulse frequency modulation) operation. However, light load efficiency of the switching regulator is limited due to the large power components (e.g. drivers and power transistors) and low value inductances needed to support high current multiphase operation. For example, multiphase high frequency buck converters are suitable for supplying power to electronic devices such as processors at maximum load conditions, but efficiency at light load is poor if multiphase CCM operation is maintained. Multiphase converters can operate with improved efficiency at light load conditions if phase dropping is used to deactivate all but a single phase of the converter, and that phase is operated in DCM with PFM (pulse frequency modulation) control. However, even with single phase PFM efficiency at very low load currents suffers because the power stage components (e.g. driver and transistors) are typically quite large with high parasitic capacitance and the inductance is low to support the high current and transient requirements of the electronic device.

SUMMARY

According to the embodiments described herein, an auxiliary low power phase is provided. The auxiliary phase is optimized for light load operation and designed such that the switching regulator can seamlessly switch from multiphase operation to operation with the auxiliary phase being active under light load conditions. The auxiliary phase can remain active under maximum or transient load conditions, or can be deactivated.

According to an embodiment of a switching regulator, the regulator includes a multiphase buck converter which has a plurality of main phases configured to covert a power supply voltage to a lower voltage for application to an electronic device at different load conditions. The switching regulator also includes an auxiliary phase configured to operate in a pulse frequency modulation mode during a light load condition so that power is supplied to the electronic device by at least the auxiliary phase during the light load condition.

According to an embodiment of a power supply circuit, the power supply circuit includes a multiphase converter, an auxiliary phase and a controller. The multiphase converter has a plurality of main phases coupled to a first power supply voltage and configured to covert the first power supply voltage to a lower voltage for application to an electronic device at different load conditions. The auxiliary phase is coupled to a second power supply voltage lower than the first power supply voltage and configured to operate in a pulse frequency modulation mode during a light load condition so that power is supplied to the electronic device by at least the auxiliary phase during the light load condition. The controller is operable to control operation of the multiphase converter and the auxiliary phase, the controller and the auxiliary phase being integrated on the same die and coupled to the same power supply voltage.

According to an embodiment of a method of operating a switching regulator, the method includes: controlling a plurality of main phases of a multiphase converter so that a power supply voltage applied to the plurality of main phases is converted to a lower voltage for application to an electronic device at different load conditions; and operating an auxiliary phase in a pulse frequency modulation mode during a light load condition so that power is supplied to the electronic device by at least the auxiliary phase during the light load condition.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Figure 1:
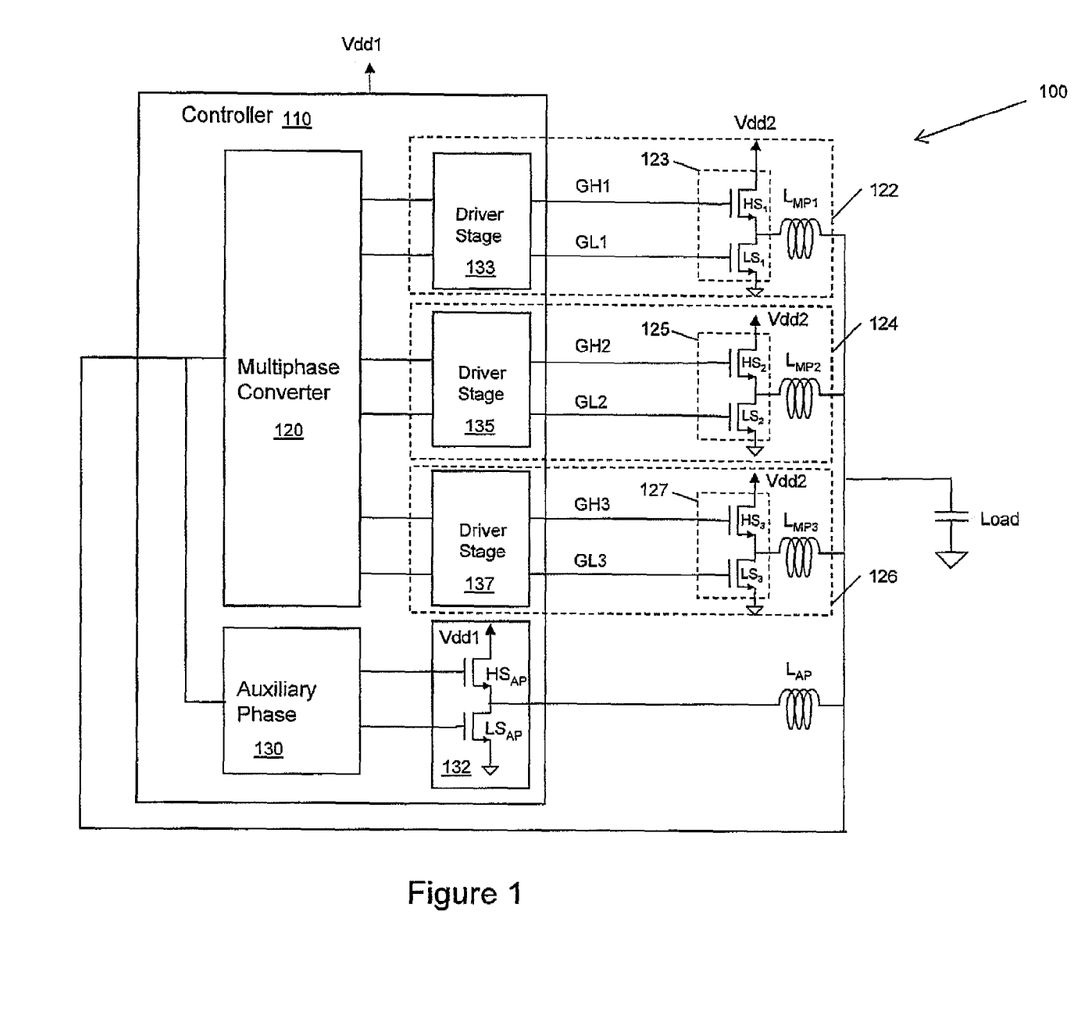
FIG. 1 illustrates a block diagram of a switching regulator which includes a multiphase buck converter and an auxiliary phase for light load operation.

FIG. 1 illustrates an embodiment of a switching regulator 100. The switching regulator 100 includes a controller 110, a multiphase buck converter 120 and an auxiliary low power phase 130. The controller 110 controls the operation of the multiphase converter 120 and the auxiliary phase 130. The multiphase buck converter 120 includes a plurality of main phases 122, 124, 126 configured to covert an input voltage Vdd2 to a lower voltage for application to an electronic device at different load conditions. The electronic device is schematically illustrated in FIG. 1 as a capacitive load. The multiphase buck converter 120 is shown with three main phases 122, 124, 126 for ease of illustration, but may include any number of main phases. The auxiliary phase 130 operates in pulse frequency modulation (PFM) mode to deliver a small amount of output current to the electronic device at light load conditions (e.g. at output currents typically under 1 A), and in doing so increases the light load efficiency of the switching regulator 100 under light load conditions. This way, power is supplied to the electronic device by at least the auxiliary phase 130 at light load conditions.

The auxiliary low power phase 130 is compatible with operation of the multiphase converter 120 in any regulation mode such as PWM (pulse width modulation), PFM, variable frequency, hysteretic, voltage mode, current mode, etc. For example, the auxiliary phase 130 can operate in parallel (independently) with PWM (CCM) or PFM (DCM) operation of one or more main phases 122, 124, 126 of the multiphase buck converter 120. The auxiliary phase 130 is current limited due to its PFM mode of operation. The auxiliary phase 130 has small ripple due to a high output inductance $L_{AP}$, high output capacitance and low output current. The switching regulator 100 operates efficiently at light load conditions due to the auxiliary phase 130.

The switching regulator 100 has two different types of power stages. The first type of power stage includes the power stages 123, 125, 127 associated with the corresponding main phases 122, 124, 126 of the multiphase buck converter 120 which operate at a relatively high voltage Vdd2 e.g. 9 to 21V. Each buck converter power stage 123/125/127 is driven by a corresponding driver stage 123/125/127 under control of the controller 100. The buck converter power stages 123, 125, 127 can be operated in any CCM or DCM mode by driving the respective gate input signals GHn/GLn to the corresponding power stage accordingly.

The second type of power stage includes the power stage 132 132 associated with the auxiliary low power phase 130. The auxiliary phase power stage 132 has a lower input voltage Vdd1 e.g. 3.3 to 5 V than the main power stages 123, 125, 127. The auxiliary phase power stage 132 minimizes power losses at light load conditions. In one embodiment, the auxiliary phase power stage 132 includes a high-side FET (field effect transistor) $HS_{AP}$ coupled to the lower supply voltage Vdd1 and a low-side FET $LS_{AP}$ coupled to ground or other low potential.

The FETs included in the auxiliary phase power stage 132 are lower voltage FETs which occupy smaller physical area than the higher voltage FETs $HS_n/LS_n$ included in the power stages 123, 125, 127 associated with the main phases 122, 124, 126 of the multiphase buck converter 120. The auxiliary phase FETs $HS_{AP}/LS_{AP}$ also have higher figure of merit, with low RDSon (drain-to-source on resistance), low Qg (gate capacitance), and low Qd (drain capacitance), resulting in low conductive and switching losses and higher efficiency. In addition, the inductor $L_{AP}$ coupled to the output of the auxiliary phase 130 consumes less physical area than the inductors $L_{MPn}$ coupled to the output of the main buck converter phases 122, 124, 126 because $L_{AP}$ has a significantly smaller saturation current value e.g. on the order of 10× smaller. Also, the auxiliary phase inductor $L_{AP}$ has a higher inductance than the inductors $L_{MPn}$ of the main buck converter phases 122, 124, 126. For example, the main phase inductors $L_{MPn}$ may be in the pH range and the auxiliary phase inductor $L_{AP}$ may be in the nH range. In one embodiment, the controller 110 and the auxiliary phase power stage 132 are integrated on the same die and coupled to the same power supply voltage (e.g. Vdd1). According to this embodiment, the controller power supply is used to generate lower dI/dt and permit the use of a physically smaller, lower value inductor $L_{AP}$ at the output of the auxiliary phase 130 as compared to the inductors $L_{MPn}$ of the main buck converter phases 122, 124, 126.

During operation, the multiphase buck converter 120 can be operated in various modes. During maximum or transient load conditions, all main phases 122, 124, 126 of the multiphase converter 120 can be operated in CCM mode to efficiently deliver full power to the electronic device by controlling the corresponding gate inputs GHn/GLn accordingly. As the load power decreases, main phases can be successively deactivated or deactivated in parallel other until only a single main phase of the multiphase buck converter 120 is active and operating in CCM mode, e.g. the third main phase 126 shown in FIG. 1. A further decrease in the load condition can cause the controller 110 to transition the single active main phase 126 from CCM to PFM mode (DCM). The auxiliary phase 130 is also active during the light load conditions, and delivers a limited amount of current to the load in PFM mode. If the auxiliary phase 130 is capable of supplying the total output current to the load, all main phases 122, 124, 126 of the multiphase buck converter 120 can be deactivated to further increase efficiency of the switching regulator 100. The thresholds used to activate/deactivate the different phases of the multiphase buck converter 120 and the auxiliary phase 130 can be based on sensed load voltage or current. In each case, the auxiliary phase 130 is operated in PFM mode.

Figure 2:
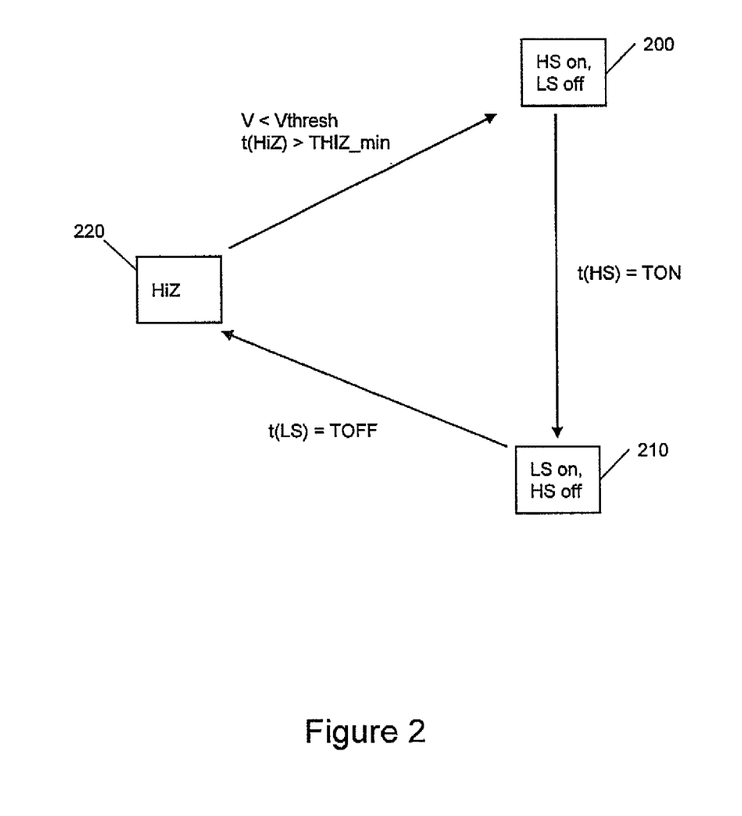
FIG. 2 illustrates a state diagram associated with the operation of the auxiliary phase of FIG. 1.
Figure 3:
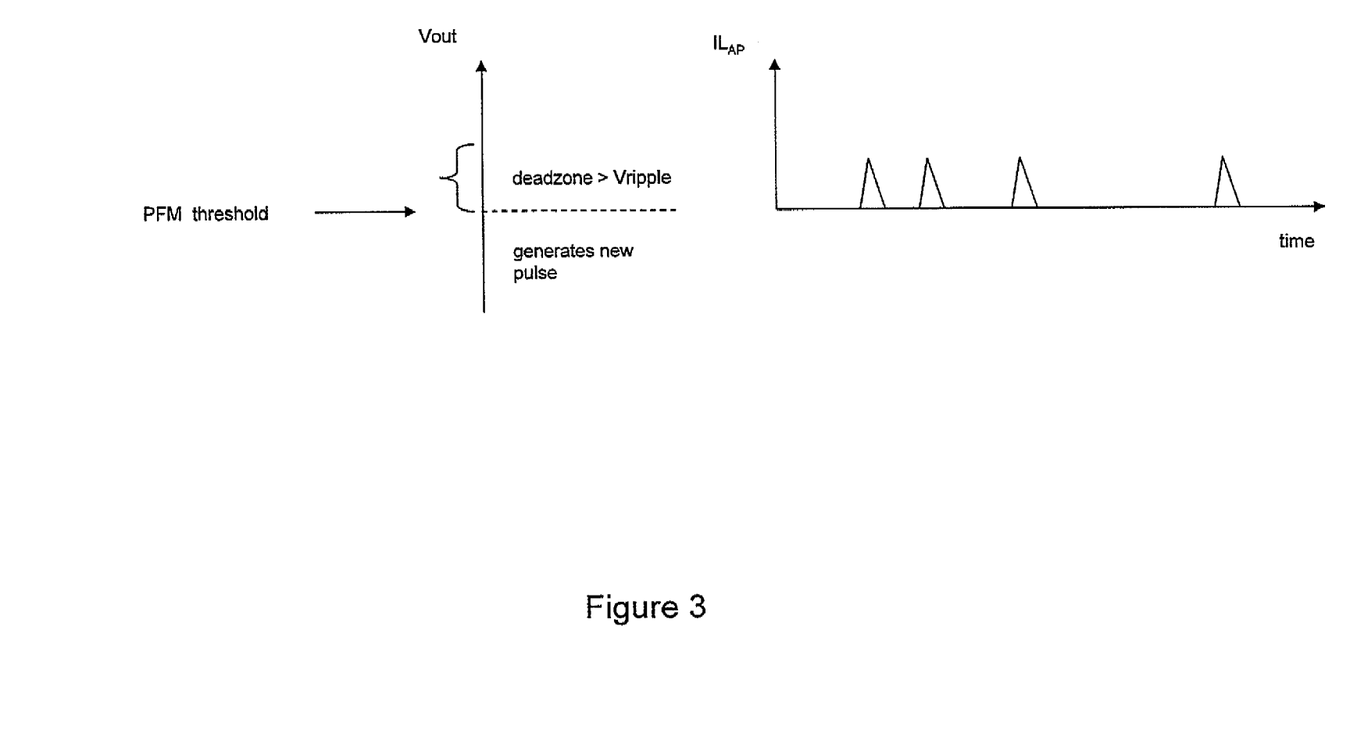
FIG. 3 illustrates an output waveform diagram associated with the operation of the auxiliary phase of FIG. 1.

FIG. 2 illustrates a state diagram representing the different operational states of the auxiliary low power phase 130 in PFM mode. PFM is a control method for stabilizing an output voltage by modulating the switching pulse output frequency while pulse width is maintained relatively constant as shown in FIG. 3. A new PFM pulse is initiated for the auxiliary phase 130 when the output voltage (or current) applied to the load drops below a predefined threshold voltage (or current). For each new generated PFM pulse, the high-side switch $HS_{AP}$ of the auxiliary phase 130 is first turned on and the low-side switch $LS_{AP}$ remains off for a period of time t(HS) in the first state 200. In the second state 210, the high-side switch $HS_{AP}$ is turned off and the low-side switch $LS_{AP}$ is turned on for a second period of time t(LS). Both switches $HS_{AP}$ and $LS_{AP}$ are turned off in the third state 220 so that the auxiliary phase 130 enters a HiZ impedance output state for a third period of time t(HiZ). Such PFM control causes the current in the auxiliary phase inductor $L_{AP}$ to ramp from zero to a maximum value ($i_{MAX}$) then back to zero and remain at zero until a new PFM pulse is generated.

A large output capacitance and low inductor current ($IL_{AP}$) for the auxiliary phase 130 limit output voltage ripple as shown in FIG. 3. So-called 'dead zones' occur when the switching regulator 100 does not couple the load to a supply voltage (i.e. when the HS switch is off and the LS switch is on). Such dead zones arise when a PFM pulse causes a ripple in the output voltage (Vout) which is above the predefined threshold for generating a new PFM pulse. The ripple subsequently decays to the threshold value which then triggers a new PFM pulse to occur i.e. so-called 'valley control'. The auxiliary phase 130 can be designed for maximum peak current ($i_{MAX}$) and maximum efficiency in PFM mode in order to limit output voltage ripple. In one embodiment, the amount of time t(HS) the high-side switch $HS_{AP}$ is on (and the low-side switch $LS_{AP}$ is off) after a PFM pulse is given by:

$$t_{on} = i_{max} \cdot \frac{L_{AP}}{(V_{in} - V_{out})} \quad (1)$$

where $L_{AP}$ is the inductance of the inductor coupled to the output of the auxiliary phase 130, Vin is the auxiliary phase input voltage (e.g. Vdd1 in FIG. 1) and Vout is the auxiliary phase output voltage applied to the load.

The amount of time t(LS) the low-side switch $LS_{AP}$ is on after the high-side switch $HS_{AP}$ is turned off is calculated as given by:

$$t_{off} = i_{max} \cdot \frac{L_{AP}}{V_{out}} = t_{on} \cdot \frac{(V_{in} - V_{out})}{V_{out}} \quad (2)$$

The amount of time t(HiZ) the high-side and low-side switches $LS_{AP}$ and $HS_{AP}$ remain in the HiZ impedance state before the high-side switch $HS_{AP}$ is permitted to turn on again in response to a new PFM pulse is determined by setting the voltage ripple valley equal to the threshold voltage (Vthresh) and regulating the output so that the output current (iout) of the auxiliary phase 130 equals the load current (iload) as given by:

$$i_{out} = \frac{i_{max}}{2} \cdot \frac{t_{on} + t_{off}}{t_{on} + t_{off} + t_{hiz}} \quad (3)$$

A new PFM pulse is generated when Vout drops below Vthresh. However, the high-side switch $HS_{AP}$ does not transition from the HiZ impedance state 220 to the on state 200 until a minimum time period THIZ_min is satisfied in which both switches $HS_{AP}$ and $LS_{AP}$ remain in the HZ state regardless of whether a new PFM pulse has been generated. This ensures proper PFM operation of the auxiliary phase 130.

The on-time t(HS) and off-time t(LS) of the auxiliary phase 130 can be calculated based on the input and output voltages and auxiliary phase inductance value as given by equations (1-3) so that the maximum peak current ($i_{MAX}$) in the inductor $L_{AP}$ is fixed. Setting the threshold voltage (or current) of the auxiliary phase 130 slightly higher than that of the multiphase buck converter 120 ensures the auxiliary phase 130 fully supports the output current of the electronic device at sufficiently low load values. The multiphase converter 120 can be deactivated at such low load values to further increase the regulator efficiency which is dependent only on the auxiliary phase 130 under these conditions. Alternatively, one or more main phases 122, 124, 126 of the multiphase converter 120 can remain active under light load conditions.

Figure 4:
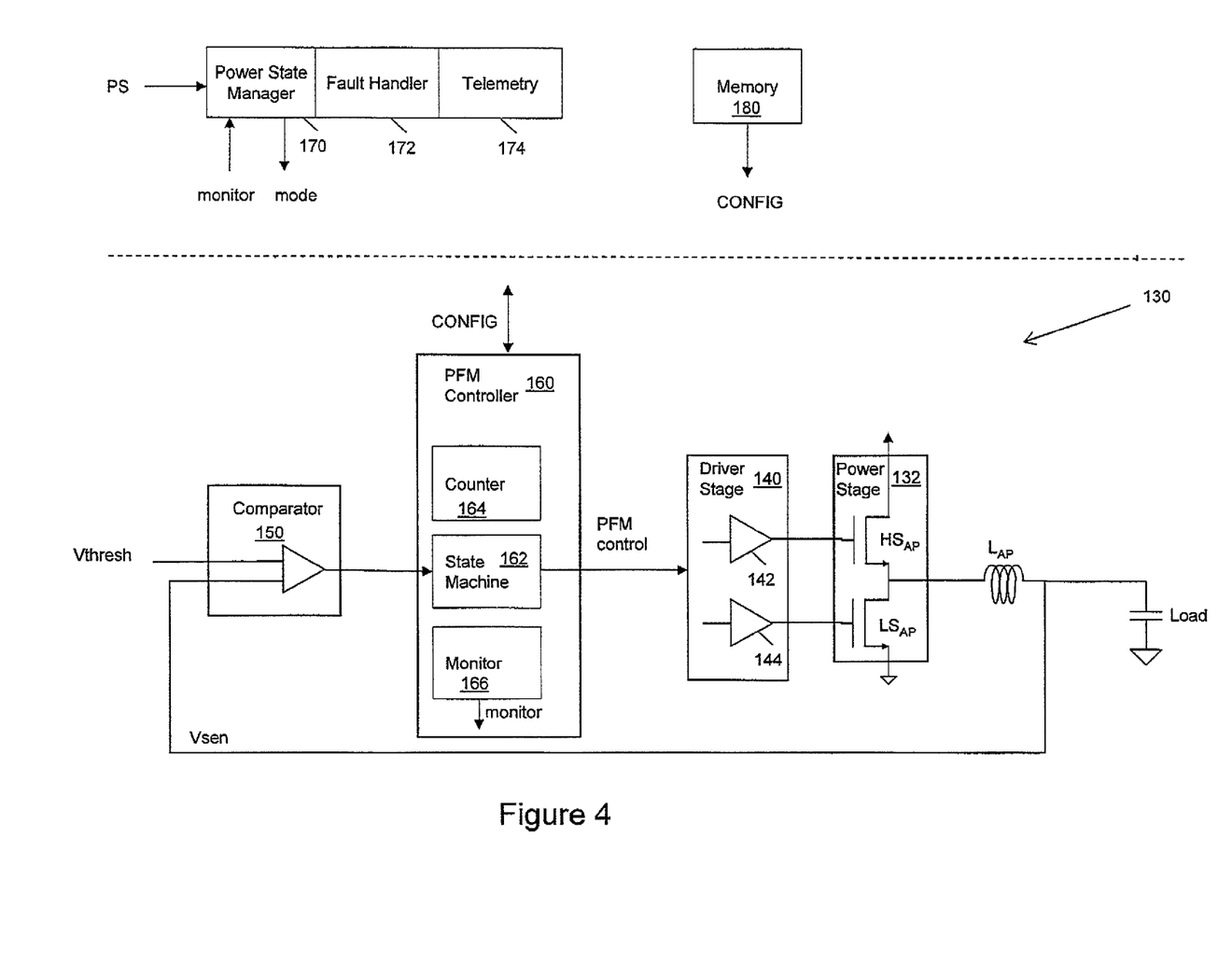
FIG. 4 illustrates a block diagram of the auxiliary phase of FIG. 1.

FIG. 4 illustrates an embodiment of the auxiliary low power phase 130. According to this embodiment, the auxiliary phase 130 includes a driver stage 140 which has corresponding drivers 142, 144 for driving the high-side and low-side switches $HS_{AP}$ and $LS_{AP}$ of the auxiliary phase power stage 132. The auxiliary phase 130 also includes a comparator 150 and a PFM controller 160 which controls PFM operation of the auxiliary phase 130. The comparator 150 and/or PFM controller 160 can be integrated on the same die as the main controller 110 of the switching regulator 100, or can be provided on one or more separate die.

The comparator 150 determines if the sensed output voltage (Vsen) falls below the predefined threshold (Vthresh), and if so, generates a PFM control pulse at its output. The PFM controller 160 includes a state machine 162 which implements the state diagram of FIG. 2 in response to a new PFM control pulse generated at the output of the comparator 150. The PFM controller 160 also includes a counter 164 for ensuring the time period t(HS) for the first state 200, the time period t(LS) for the second state 210 and the time period t(HiZ) for the third state 220 in FIG. 2 are properly adhered to. The PFM controller 160 further includes a monitor 166 for determining whether the output (Vsen) of the auxiliary phase 130 in PFM mode violates a particular load criterion over a predefined interval, and if so, generates a signal (monitor) indicating one or more previously deactivated ones of the main phases 122, 124, 126 of the multiphase buck converter 120 are to be activated to assist the auxiliary phase 130. That is, the monitor 166 determines whether the auxiliary phase 130 in PFM mode can sustain the load current over some interval. In one embodiment, the monitor 166 monitors the time period t(HiZ) which indicates how long the high-side and low-side switches $HS_{AP}$ and $LS_{AP}$ are to remain in the HiZ state 220 and determines whether the minimum time period THIZ_min is satisfied before the high-side switch $HS_{AP}$ is permitted to enter the on-state 200, regardless of whether a new PFM pulse has been generated.

The various parameters associated with operation of the auxiliary phase 130 such as Vthresh, t(HS), t(LS), t(HiZ), THIZ_min, etc. can be programmable e.g. by the main controller 110 of the switching regulator 100 or other device such as a processor as indicated by the CONFIG input to the PFM controller 160. Also, the PFM controller 160 may be instructed by some other device e.g. the load device as to when the auxiliary phase 130 should be active. For example, processors typically instruct the regulator 100 as to different power modes of the processor. The regulator 100 responds by adjusting the output power level accordingly as previously described herein. As such, the auxiliary phase 130 may be activated and/or deactivated in PFM mode in response to input received from another device such as a processor regardless of actual load conditions.

In one embodiment, the PFM controller 160 or the main controller 110 of the switching regulator 100 has a power state manager 170 which determines the present operational state of the auxiliary phase 130. This may be determined in response to the signal (monitor) output by the monitor 166 of the PFM controller 160, or based on an external power control command (PS) received by the power state manager 170 e.g. from a processor. In response, the power state manager 170 sends mode information (mode) to the PFM controller 160 which determines the operating mode of the auxiliary phase 130 as previously described herein. The PFM controller 160 or the main controller 110 of the switching regulator 100 may also have a fault handler 172 for handling regulator faults and/or a telemetry unit 174 for remote measuring and reporting of information about the switching regulator 100. The configuration information (CONFIG) used by the PFM controller 160 can be stored in a memory 180 included in or associated with the switching regulator 100.

Figure 5:
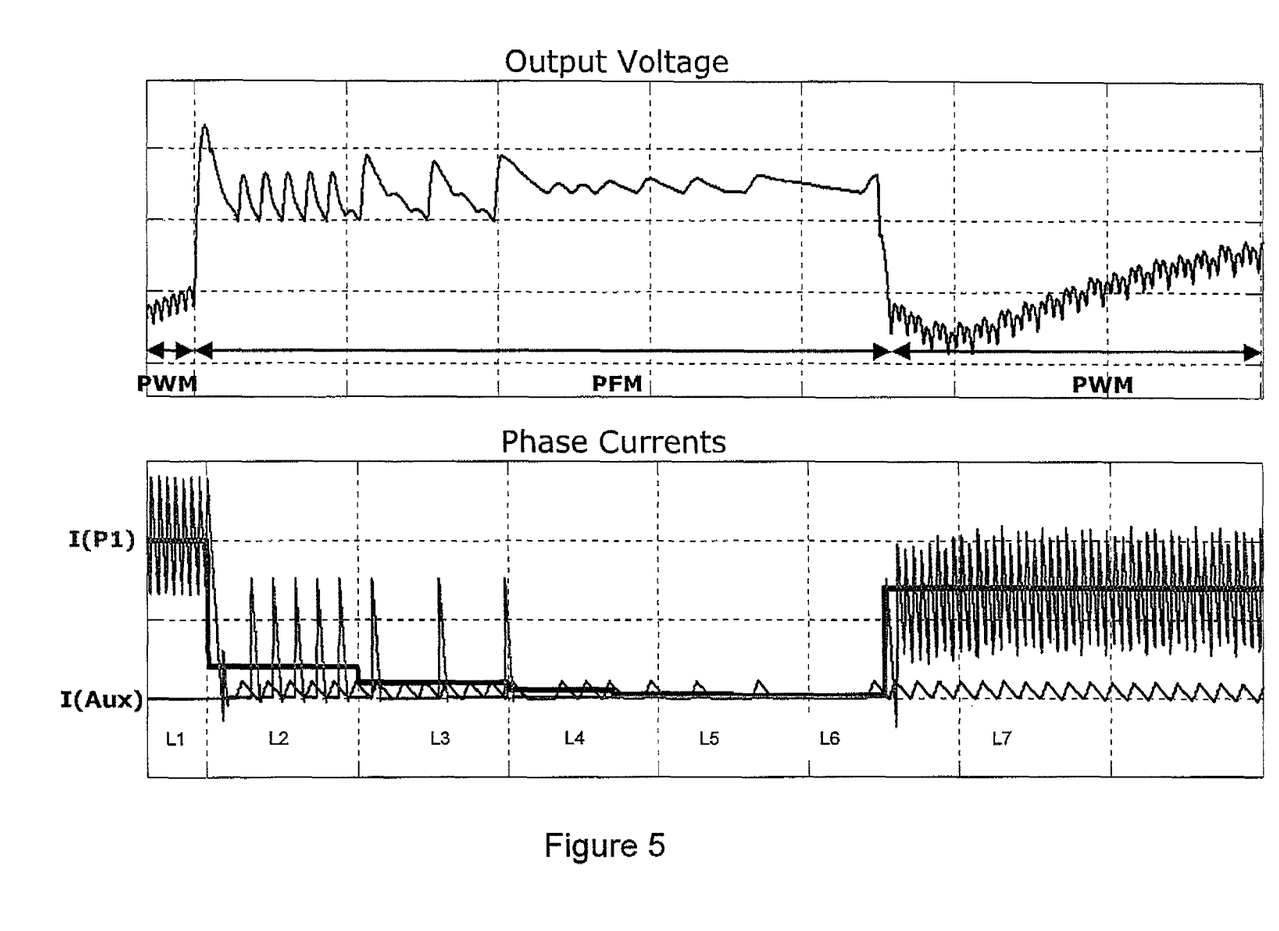
FIG. 5 illustrates waveform diagrams associated with the operation of the switching regulator of FIG. 1.

FIG. 5 illustrates the output voltage of the switching regulator 100 and the phase currents of the multiphase buck converter 120 and auxiliary phase 130 according to one embodiment. FIG. 5 includes an upper graph labelled 'Output Voltage' which shows the output voltage of the switching regulator 100 and a lower graph labelled 'Phase Currents' which shows the output current I(P1) of one main phase of the buck converter 120 and the output current I(Aux) of the auxiliary phase 130 at different load conditions. According to this embodiment, all phases 122, 124, 126 of the multiphase buck converter 120 are operated in PWM CCM during a maximum load condition. This mode of operation corresponds to the leftmost region labeled 'PWM' in the upper graph of FIG. 5 and the region labeled 'L1' in the lower graph of FIG. 5. The auxiliary phase 130 can be active in this state, or deactivated as shown in region 'L1' of the lower graph of FIG. 5.

In response to a decrease in the load current, different ones of the buck converter main phases 122, 124, 126 are deactivated until a single one of the main phases 122/124/126 remains activate. The decreasing load current is represented by a drop in I(P1) from region 'L1' to region 'L2' in the lower graph of FIG. 5. The auxiliary phase is also active in PFM mode in region 'L2' as indicated by the spikes in I(AuX). If the load current becomes low enough, the remaining single active phase of the buck converter 120 operates in PFM DCM instead of PWM CCM. Under the light load condition represented by region 'L2' in the lower graph of FIG. 5, the single main phase of the multiphase buck converter 120 and the auxiliary phase 130 both provide current to the load in PFM mode. This mode of operation corresponds to the region labeled 'PFM' in the upper graph of FIG. 5.

In response to a further decrease in the load condition as indicated by the region labeled 'L3' in the lower graph of FIG. 5, the respective PFM pulses applied to the single active main phase of the buck converter 120 and to the auxiliary phase 130 are spaced further apart to accommodate the decreasing load current. In general, a PFM pulse is applied to the auxiliary phase 130 responsive to the load current or load voltage falling below a predefined threshold as previously described herein. The threshold at which a new PFM pulse is generated for the auxiliary phase 130 is higher than the threshold needed to generate a new PFM pulse for the remaining active main phase of the buck converter 120, ensuring a seamless transition between different load conditions.

The load current can decrease to such a low value that only the auxiliary phase 130 remains active to supply the load current as indicated by the regions labeled 'L4' to 'L6' in the lower graph of FIG. 5. Under such light load conditions, the last remaining active main phase of the buck converter 120 can be deactivated which is represented in the lower graph of FIG. 5 by I(P1) equaling zero in regions 'L4' to 'L6'. The PFM pulses applied to the auxiliary phase 130 are spaced even further apart during these light load conditions, which causes a corresponding further spacing in the current pulses of I(Aux). Each subsequent PFM pulse is generated when the output voltage as shown in the upper graph of FIG. 5 drops below the threshold value as previously described herein. The auxiliary phase 130 can be deactivated when the load current decreases to zero for a sufficient period of time e.g. when the output voltage does not drop below the threshold during a light load condition.

The load current eventually increases due to some activity at the load as indicated by the region labeled 'L7' in the lower graph of FIG. 5. This in turn causes one or more of the main buck converter phases 122, 124, 126 to be reactivated e.g. in PWM mode as indicated by the rightmost region in the upper graph of FIG. 5. The lower graph of FIG. 5 shows that the auxiliary phase 130 can remain operational (active) in this PFM buck converter mode, contributing only a small amount of current to the total load current. Optionally, the auxiliary phase 130 can be deactivated when the load is not operating in a light load condition. In one embodiment, the auxiliary phase 130 is deactivated responsive to a command from the electronic device such as a processor indicating the auxiliary phase 130 is to be deactivated. In another embodiment, the auxiliary phase 130 is deactivated responsive to an increase in the load condition as represented by the transition from region 'L6' to 'L7' in the lower graph of FIG. 5.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A switching regulator, comprising:
a multiphase buck converter comprising a plurality of main phases configured to covert a power supply voltage to a lower voltage for application to an electronic device at different load conditions; and
an auxiliary phase configured to operate in a pulse frequency modulation mode during a light load condition so that power is supplied to the electronic device by at least the auxiliary phase during the light load condition,
wherein the auxiliary phase and the plurality of main phases of the multiphase buck converter each comprise field effect transistors,
wherein the field effect transistors of the auxiliary phase are lower voltage transistors which occupy smaller physical area than the field effect transistors of the main phases,
wherein the auxiliary phase and each of the plurality of main phases of the multiphase buck converter has an output coupled to an inductor,
wherein the inductor coupled to the output of the auxiliary phase occupies less physical area and has a lower saturation current than the inductors coupled to the outputs of the main phases.

2. The switching regulator according to claim 1, wherein the field effect transistors of the auxiliary phase have a lower gate drive voltage and lower gate capacitance than the field effect transistors of the main phases.

3. The switching regulator according to claim 1, wherein a single main phase of the multiphase buck converter is activated in a continuous current mode or a discontinuous current mode and the other main phases are deactivated during the light load condition.

4. The switching regulator according to claim 3, wherein the single main phase of the multiphase buck converter is configured to transition from the continuous current mode to the discontinuous current mode responsive to a decrease in the load condition and the auxiliary phase remains operational in the pulse frequency modulation mode.

5. The switching regulator according to claim 1, wherein the auxiliary phase is configured to be deactivated responsive to a command from the electronic device indicating the auxiliary phase is to be deactivated.

6. The switching regulator according to claim 1, wherein the auxiliary phase is configured to be deactivated responsive to an increase in the load condition.

7. The switching regulator according to claim 1, wherein the auxiliary phase is configured to remain operational in the pulse frequency modulation mode regardless of how many main phases of the multiphase buck converter are activated.

8. The switching regulator according to claim 1, wherein pulse frequency modulation pulses are applied to the auxiliary phase responsive to the load current or load voltage falling below a threshold.

9. The switching regulator according to claim 8, wherein pulse frequency modulation pulses are applied to only a single main phase of the multiphase buck converter responsive to the load current or load voltage falling below the threshold, and wherein the threshold at which the pulse frequency modulation pulses are applied to the auxiliary phase is higher than the threshold at which the pulse frequency modulation pulses are applied to the single main phase of the multiphase buck converter.

10. The switching regulator according to claim 8, wherein the auxiliary phase comprises a high-side switch and a low-side switch, and wherein both switches are configured to remain in a high-impedance off-state after the load current or load voltage falls below the corresponding threshold until at least a current in an inductor coupled to the output of the auxiliary phase reaches zero before the high-side switch is turned on.

11. The switching regulator according to claim 10, wherein the thresholds are voltage thresholds.

12. A method of operating a switching regulator, comprising:
controlling a plurality of main phases of a multiphase converter so that a power supply voltage applied to the plurality of main phases is converted to a lower voltage for application to an electronic device at different load conditions;
operating an auxiliary phase in a pulse frequency modulation mode during a light load condition so that power is supplied to the electronic device by at least the auxiliary phase during the light load condition, by applying pulse frequency modulation pulses to the auxiliary phase responsive to the load current or load voltage falling below a threshold; and
maintaining a high-side switch and a low-side switch of the auxiliary phase in a high-impedance off-state after the load current or load voltage falls below the threshold until at least a current in an inductor coupled to the output of the auxiliary phase reaches zero before the high-side switch is turned on.

13. The method according to claim 12, comprising enabling a single main phase of the multiphase converter in a continuous current mode or a discontinuous current mode and disabling the other main phases during the light load condition.

14. The method according to claim 13, comprising switching the single main phase of the multiphase converter from the continuous current mode to the discontinuous current mode responsive to a decrease in the load condition while maintaining the auxiliary phase in the pulse frequency modulation mode.

15. The method according to claim 12, comprising disabling the auxiliary phase responsive to a command from the electronic device indicating the auxiliary phase is to be deactivated.

16. The method according to claim 12, comprising disabling the auxiliary phase responsive to an increase in the load condition.

17. The method according to claim 12, comprising maintaining the auxiliary phase in the pulse frequency modulation mode regardless of how many main phases of the multiphase converter are activated.

18. The method according to claim 12, further comprising determining whether the output of the auxiliary phase in the pulse frequency modulation mode violates a load criterion over a predefined interval, and if so, enabling one or more previously deactivated ones of the main phases of the multiphase converter.

19. A switching regulator, comprising:
a multiphase buck converter comprising a plurality of main phases configured to covert a power supply voltage to a lower voltage for application to an electronic device at different load conditions; and
an auxiliary phase configured to operate in a pulse frequency modulation mode during a light load condition so that power is supplied to the electronic device by at least the auxiliary phase during the light load condition,
wherein pulse frequency modulation pulses are applied to the auxiliary phase responsive to the load current or load voltage falling below a threshold,
wherein pulse frequency modulation pulses are applied to only a single main phase of the multiphase buck converter responsive to the load current or load voltage falling below the threshold, and wherein the threshold at which the pulse frequency modulation pulses are applied to the auxiliary phase is higher than the threshold at which the pulse frequency modulation pulses are applied to the single main phase of the multiphase buck converter.

20. The switching regulator according to claim 19, wherein the auxiliary phase comprises a high-side switch and a low-side switch, and wherein both switches are configured to remain in a high-impedance off-state after the load current or load voltage falls below the corresponding threshold until at least a current in an inductor coupled to the output of the auxiliary phase reaches zero before the high-side switch is turned on.

21. The switching regulator according to claim 20, wherein the thresholds are voltage thresholds.

22. A method of operating a switching regulator, comprising:
controlling a plurality of main phases of a multiphase converter so that a power supply voltage applied to the plurality of main phases is converted to a lower voltage for application to an electronic device at different load conditions;
operating an auxiliary phase in a pulse frequency modulation mode during a light load condition so that power is supplied to the electronic device by at least the auxiliary phase during the light load condition; and
determining whether the output of the auxiliary phase in the pulse frequency modulation mode violates a load criterion over a predefined interval, and if so, enabling one or more previously deactivated ones of the main phases of the multiphase converter.

* * * * *